(No Model.) 3 Sheets—Sheet 2.

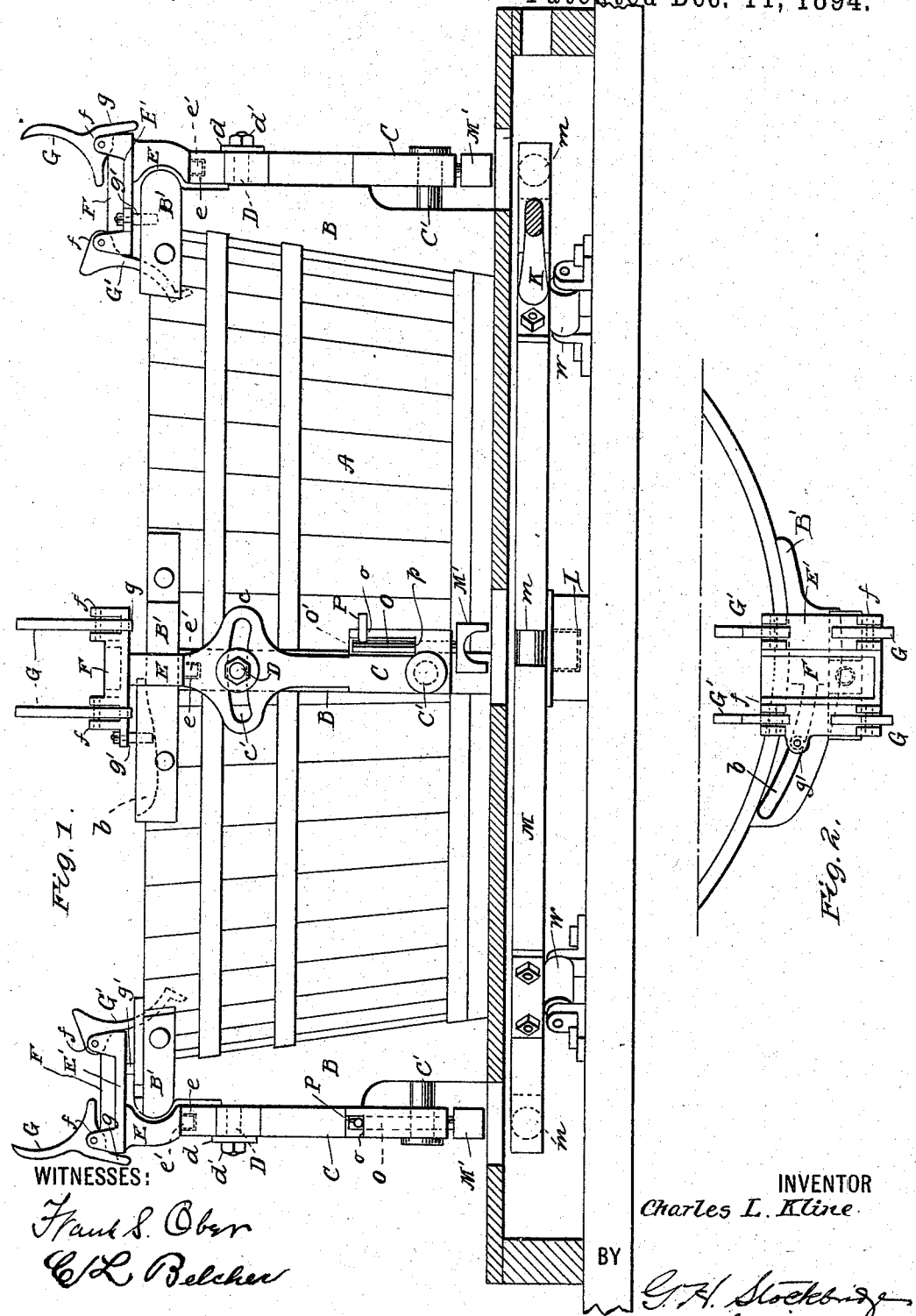

C. L. KLINE.
BARREL WASHER.

No. 530,593. Patented Dec. 11, 1894.

WITNESSES:
Frank S. Ober
C. L. Belcher

INVENTOR
Charles L. Kline
BY
G. H. Stockbridge
his ATTORNEY (No Model.) 3 Sheets—Sheet 3.
C. L. KLINE.
BARREL WASHER.
No. 530,593. Patented Dec. 11, 1894.
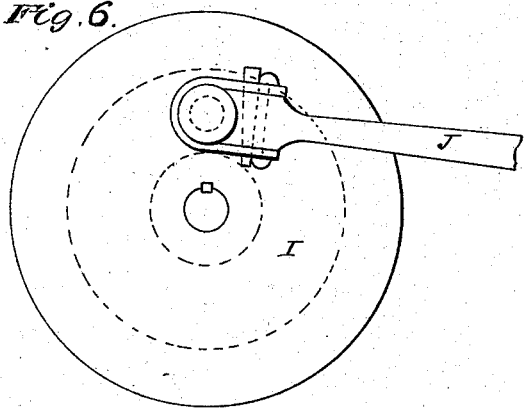
Fig. 6.
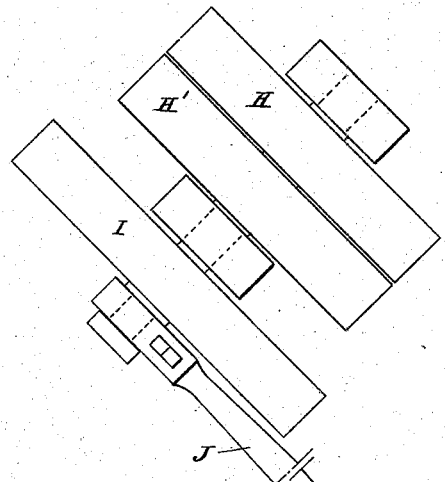
Fig. 5.
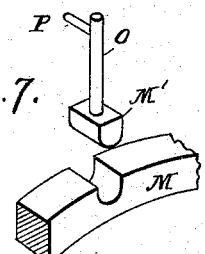
Fig. 7.
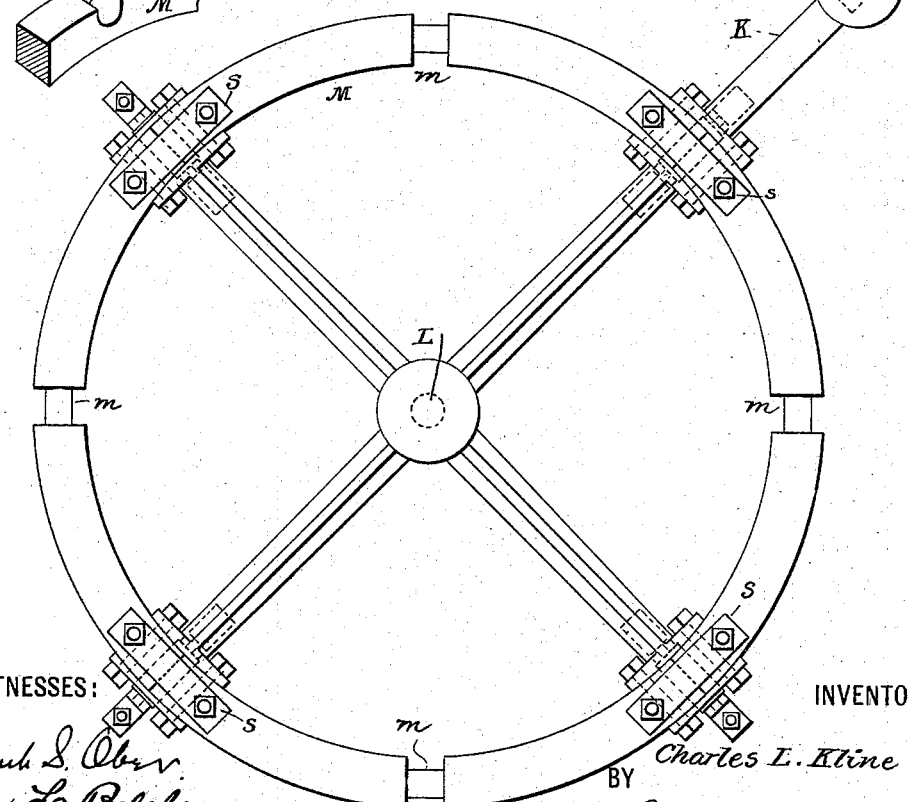
WITNESSES:
Frank S. Ober
C. H. Belcher
INVENTOR
Charles L. Kline
BY G. H. Stockbridge
his ATTORNEY

UNITED STATES PATENT OFFICE.

CHARLES L. KLINE, OF NEW YORK, N. Y.

BARREL-WASHER.

SPECIFICATION forming part of Letters Patent No. 530,593, dated December 11, 1894.

Application filed June 1, 1893. Serial No. 476,238. (No model.)

*To all whom it may concern:*

Be it known that I, CHARLES L. KLINE, a citizen of the United States, residing at New York, in the county of New York and State of New York, have invented certain new and useful Improvements in Apparatus for Washing Kegs or Barrels; and I do hereby declare the following to be a full, clear, and exact description of the invention, such as will enable others skilled in the art to which it appertains to make and use the same.

My invention relates to improvements in apparatus for cleansing beer kegs or barrels, the object of the same being to produce an apparatus which practically imitates in detail the movements which experience with hand cleansing has shown to be most efficient.

The machine which I have invented will perform easily, quickly and efficiently, all the work required for cleansing beer kegs or barrels, including the operations of swinging, tipping, tilting and rolling the kegs, which are called for in order to secure the end sought.

In order to make the details of my invention clear to those skilled in the art to which it appertains, I will now describe it by reference to the accompanying drawings, in which—

Figure 4:
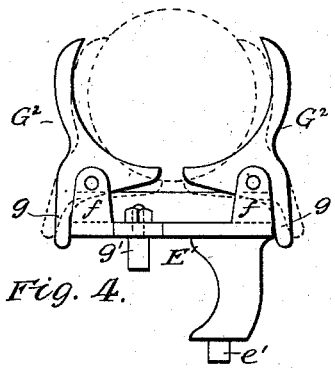
Figure 3:
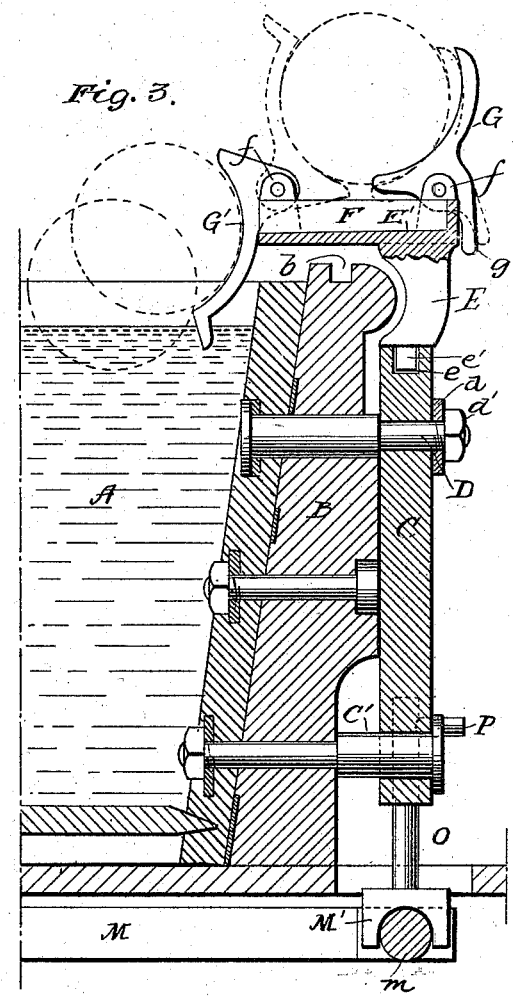
Figure 9:
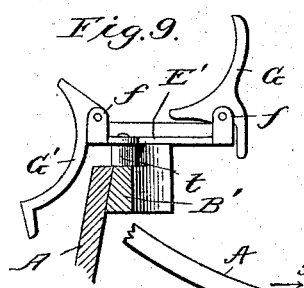
Figure 8:
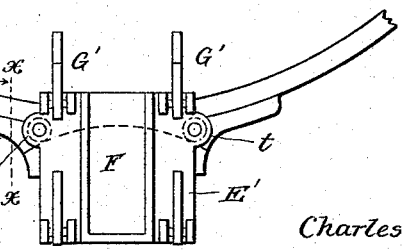

Figure 1 is a side elevation of a vat having my apparatus attached to the outer wall thereof. Fig. 2 is a plan view of my attachment. Fig. 3 is a central vertical section of those parts of my apparatus which are attached to the outer wall of the vat. Fig. 4 is a detail view of a different form of carrier or holder for the kegs or barrels. Fig. 5 is a detail plan view of a reciprocating wheel or ring which forms a part of my apparatus. Fig. 6 is a side elevation of my motor driving wheel and its attachments. Fig. 7 illustrates a modification of the means of connection between the motor driving wheel and that part of my apparatus which is attached to the vat. Fig. 8 is a plan view of a modification of device for causing certain of the motions of the holder or carrier, and Fig. 9 is a section of the same on the line $x$—$x$ of Fig. 8.

Referring to the drawings by letter, A, is a vat, partly filled with water. In practice, the said vat is filled nearly to the top with the cleansing liquid. On the outside of the said vat I secure a metallic standard or bearing, B, to form a suitable support for the main working parts of my invention. The said standard, B, is formed at the top into a curved head, B', which takes the shape of the upper part of the vat, and is bolted thereto. The head, B', on one side of the upright portion of the standard, B, is carried somewhat above the edge of the vat, and broadened out so as to form a rather wide surface. In this broadened portion is a curved slot, $b$, (see Fig. 2,) the object of which will be explained further on. Outside the standard, B, is a tilting lever, C, pivoted near its bottom upon the bolt, C', which extends all the way through the lever, C, the standard, B, and the vat, A, being provided with a suitable head outside the lever, C, and a suitable nut inside the wall of the vat. The lever, C, near its top, or, at least, above its middle portion, is enlarged, as shown at $c$, and provided with a slot, $c'$, which is curved from the pivot, C', as a center. Through the slot, $c'$, extends a bolt, D, from the standard, B, on which bolt is a washer, $d$, and a suitable protecting nut, $d'$. It is evident that the lever, C, may tilt back and forth within the limits of the ends of the slot, $c'$, the center of motion being the bolt or pivot, C'. In the top of the lever, C, is an opening, $e$, into which projects or enters a pin, $e'$, on a carrier, E. The pin, $e'$, is considerably smaller than the opening, $e$, to allow considerable play.

The details of the carrier are shown most clearly in Figs. 1, 2 and 3; that is to say, of the preferred form of carrier. In this form the carrier is provided with the curving standard from which the pin $e'$ projects, and with a floor, E', in the middle of which is a sluice-way, F. There are four pairs of lugs, $f, f, f, f$, upon the floor of the carrier, and to these lugs on one side are pivoted arms, claws or fingers, G, G, and on the other side are pivoted arms, claws or fingers, G', G', of somewhat different shape. The object of the fingers, G, G, G', G', is to grasp a keg or barrel, and hold it firmly in place.

It will be seen that the carrier, or a portion of it, extends over the inner edge of the vat, A, and it will also be seen that the fingers, G', can be bent down into the vat, so as to approach very close to a keg or barrel resting on the top of the water within the vat. When the fingers are so bent downward, a workman, by drawing the keg or barrel hard against the fingers, G', G', and then gradually lifting it, can bring it over into place above the center of the carrier, and, at the same time, restore the fingers, G', G', to a substantially upright position, in which position they are adapted to co-operate with the fingers, G, G, for holding the keg in place. It will be observed that the fingers, G, G, are prevented from tipping over backward by projections, g, g, striking against the floor, E'. A pin, g', extends downward from the floor, E', into the slot, b, on the standard, B. If, now, the lever, C, be tilted backward and forward, in the manner already indicated, it will, manifestly, carry with it the holder or carrier, E, and any keg or barrel which may be held or carried thereby. At the same time, the carrier itself will be turned or twisted about, by reason of the fact that the pin, g', is pressed upon by the walls of the slot, b. In this way the barrel held by the carrier will get a thorough shaking, and when suitably supplied with water, will be cleansed and ready for refilling.

It remains to describe the means by which the foregoing apparatus is connected with the motor which operates it, and first, as to the motor itself. At H. H'. are shown a loose and a tight pulley upon the driving shaft of a motor, or power generating device of any approved construction, (which is not herein shown.) I is a fly-wheel and J. a pitman connected with the fly-wheel. Now the lever K. is joined by any suitable connection with a horizontal wheel M. which is pivoted at its center and the pitman J acts upon the lever K in such a manner as to cause the wheel M to oscillate upon its pivot L. It is evident that the oscillating movements of the lever, K, will cause the wheel M to move back and forth with a shaking motion. It is to be borne in mind that the motor for the keg or barrel cleansing apparatus is made up of the entire structure, including the power-producing device proper and the loose and tight pulleys, the fly-wheel, the pitman, J, the lever, K, and the wheel, M. Just above the rim of the wheel M, is located the locking device for connecting the wheel M and the lever C. This consists of a yoke, M', which is formed on or attached to a vertical rod, O, adapted to slide up and down in an opening, O', in the lever, C. The said opening, O', is formed in an extension of the lever, C, at one side thereof, and the said extension has its wall cut through in such a manner as to leave a shoulder, o, upon which a pin, P, extending from the rod, O, is adapted to rest. At the same time, the wall is cut away so that the said pin may descend to a position at p, considerably lower than the shoulder, o.

When the cleansing apparatus is not in operation, the rod, O, is lifted until the pin, P, rests upon the shoulder, o. In this position the yoke, M', is raised out of contact with the wheel, M. Now, it should be said that the said wheel, M, has at intervals cut away portions, m, the same being equal in number to the number of cleansing machines around the vat. It should also be understood that the said wheel is so proportioned in size to the bottom of the vat as to be in position to co-operate with the cleansing machines on every side thereof. This being understood, let us assume that the rod, O, is lowered by removing the pin, P, from the shoulder, o, and letting it fall to the ledge, p. When this is done, the yoke, M', engages with one of the cut away portions, m, and is thus brought into operative connection with the wheel M. It will be remembered that the said wheel rocks backward and forward in response to the action of the lever, K. Consequently, the yoke, M', and with it the lever, C, will be similarly rocked back and forth within the limits of the ends of the slot, c', the center of motion being the pivot of the lever, C. By this action, the carrier or holder, E, will be thrown about, as already described, and the keg or barrel which happens to be held by the carrier will be thoroughly cleansed by the action of the water inside the said keg or barrel.

In Fig. 4, I have shown a modified form of carrier, both of the fingers or claws $G^2$, $G^2$; being formed in this modification like the finger, G, in Figs. 1 and 3. In this modification it is necessary to place the kegs or barrels to be washed between the fingers or claws, in any convenient manner, after which the operations of tilting, rolling, &c., are performed in the manner already described.

I have illustrated in Fig. 5, the wheel, M, as made up of sections clamped together by laying plates, S, S, upon adjoining ends of the sections, and bolting them in place within depressions in the said ends. This is simply a convenient form of wheel, but I do not limit myself to constructing a wheel in this way.

In place of the yoke, M', acting upon the cut away portions of the wheel, M, I may supply the place of the yoke by a wedge which enters a notch in the rim of the wheel. This arrangement is illustrated in Fig. 8.

In Figs. 8 and 9, is shown a modification which is, in fact, the preferred form of device for causing certain of the motions of the holder or carrier. In this construction, the top of the standard, B, is formed with a projection, having a rounding or cam shaped vertical wall, as indicated by the broken lines. On this rounding or cam shaped surface, two rollers, pivoted on two pins, t, t, which project from the floor of the carrier, E, are adapted to run. The result is substantially the same as when the single pin, g', playing in the slot, b, is employed.

By referring to Fig. 1, it will be seen that the wheel, M, is eased in its rotary movement, or, rather, in its oscillatory or rocking movement by rollers, W, W, placed under the said wheel in such a manner as to relieve the weight and friction of its movement.

The wheel M obviously plays the part of a lever and I may call it by that name alone, or I may designate it as a circular lever, as I do in some of the claims which follow.

What I claim is—

1. In a barrel or keg washing machine, the combination with a cleansing vat containing water and adapted to hold a barrel or keg to be washed, a carrier or holder for a keg or barrel, parts of which are adapted to elevate a keg or barrel from the vat, and mechanism for imparting a four-way movement to the said carrier, as and for the purpose described.

2. In a barrel or keg washing machine, the combination of one or more barrel holding devices, a reciprocating wheel, intermediate mechanism for transmitting motion from the reciprocating wheel to the barrel holding mechanism, and devices for throwing the intermediate mechanism into and out of connection with the reciprocating wheel, substantially as described.

3. In a barrel and keg washing machine, the combination of one or more barrel-holding devices, a wheel having a circumferential reciprocation, intermediate mechanism through which motion is transmitted from the wheel to the barrel-holding mechanism, and a yoked locking device for connecting said wheel and intermediate mechanism together, substantially as and for the purpose set forth.

4. The combination with a wheel having a circumferential reciprocation, of barrel-holding devices, pivoted levers connected respectively to each of the barrel-holding devices, and locking devices on said pivoted levers engaging with said wheel, the said locking devices having moving portions which are substantially parallel to the axis of the wheel, whereby each of the pivoted levers may be separately and independently thrown into and out of operative connection with the said reciprocating wheel, as and for the purpose set forth.

5. The combination with a vat adapted to be partly filled with water and to hold a keg or barrel to be washed, of a carrier above the edge of the said vat, for receiving the keg or barrel from the vat and having two pairs of curved arms, one of which is pivoted to the carrier and adapted to be turned down into the vat, as and for the purpose set forth.

6. The combination of a carrier for kegs or barrels, loosely pivoted in the top of a vertical lever, and provided with a pin extending downward into a curved slot in the support of said lever, as and for the purpose set forth.

7. The combination with a barrel-holding device of a vertical shaking lever connected thereto and pivoted near its bottom, mechanism for reciprocating the same, and a yoke or key attached to the said lever and adapted to be moved in and out, for the purpose of throwing said lever into and out of operative connection with said reciprocating mechanism, substantially as described.

8. The combination with a vat, partly filled with water, of a carrier above the edge of the vat, the said carrier being adapted to contain a keg or barrel, and having a sluiceway for leading water from the keg or barrel back into the vat, as and for the purpose set forth.

In testimony whereof I have signed my name, in the presence of two witnesses, this 26th day of May, A. D. 1893.

CHARLES L. KLINE.

Witnesses:
G. H. STOCKBRIDGE,
HARRIETTE ZILLINGS.